United States Patent
Ota

(10) Patent No.: US 12,095,964 B2
(45) Date of Patent: Sep. 17, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuya Ota, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 355 days.

(21) Appl. No.: 17/832,754

(22) Filed: Jun. 6, 2022

(65) Prior Publication Data
US 2022/0408069 A1    Dec. 22, 2022

(30) Foreign Application Priority Data

Jun. 21, 2021 (JP) ................................. 2021-102465
Jan. 25, 2022 (JP) ................................. 2022-009393

(51) Int. Cl.
*H04N 13/117* (2018.01)
*H04N 13/167* (2018.01)
*H04N 13/194* (2018.01)

(52) U.S. Cl.
CPC ......... *H04N 13/117* (2018.05); *H04N 13/167* (2018.05); *H04N 13/194* (2018.05)

(58) Field of Classification Search
CPC ... H04N 13/117; H04N 13/167; H04N 13/194
USPC ........................................................... 348/47
See application file for complete search history.

(56) References Cited

U.S. PATENT DOCUMENTS

| 10,997,239 B2 | 5/2021 | Ota |
| 11,025,878 B2 | 6/2021 | Ota |
| 11,334,621 B2 | 5/2022 | Tta |
| 11,689,706 B2 * | 6/2023 | Handa .................. H04N 13/282 348/47 |

FOREIGN PATENT DOCUMENTS

JP    2020-042665 A    3/2020

* cited by examiner

*Primary Examiner* — Sath V Perungavoor
*Assistant Examiner* — Kristin Dobbs
(74) *Attorney, Agent, or Firm* — Carter, DeLuca & Farrell LLP

(57) ABSTRACT

The information processing apparatus obtains first viewpoint information for specifying a virtual viewpoint corresponding to a virtual viewpoint image and second viewpoint information representing a viewpoint of a first image capturing apparatus existing in an image capturing range of a second image capturing apparatus that is used for generating the virtual viewpoint image and performs control so that the image captured by the first image capturing apparatus is output in a case where a position of the first image capturing apparatus specified by the second viewpoint information is included in a field of view of the virtual viewpoint specified by the first viewpoint information.

16 Claims, 10 Drawing Sheets

VIEWPOINT COMPARISON TABLE 500

|  | NORMAL IMAGE CAPTURING CAMERA 1 | NORMAL IMAGE CAPTURING CAMERA 2 |
| --- | --- | --- |
| VIRTUAL CAMERA 1 | SIMILAR | NOT SIMILAR |
| VIRTUAL CAMERA 2 | NOT SIMILAR | SIMILAR |
| VIRTUAL CAMERA 3 | NOT SIMILAR | NOT SIMILAR |
| VIRTUAL CAMERA 4 | SIMILAR | SIMILAR |

FIG.5

INFORMATION PROCESSING APPARATUS, INFORMATION PROCESSING METHOD, AND STORAGE MEDIUM

FIELD

The present disclosure relates to processing based on a captured image.

DESCRIPTION OF THE RELATED ART

There is a method of generating a virtual viewpoint image by installing a plurality of image capturing apparatuses (virtual viewpoint image generation cameras) at different positions and using captured images obtained by capturing an object from a plurality of viewpoints. Further, there is a case where image capturing is performed by another image capturing apparatus (normal image capturing camera) different from the virtual viewpoint image generation camera. Then, there is a method of displaying a virtual viewpoint image or a captured image obtained by the normal image capturing camera performing image capturing by switching them appropriately.

Japanese Patent Laid-Open No. 2020-042665 has disclosed a method of switching between a captured image of the normal image capturing camera and a virtual viewpoint image so that a sense of incongruity that is given to a viewer is small.

However, in a case where a normal image capturing camera exists in the image capturing range of a virtual viewpoint image generation camera, there is a possibility that the normal image capturing camera is included in the virtual viewpoint image. In a case where the normal image capturing camera is included in the virtual viewpoint image, there is a possibility that the quality of the virtual viewpoint image is reduced.

SUMMARY

The information processing apparatus according to the technique of the present disclosure includes one or more memories storing instructions; and one or more processors executing the instructions to: obtain first viewpoint information for specifying a virtual viewpoint corresponding to a virtual viewpoint image and second viewpoint information representing a viewpoint of a first image capturing apparatus existing in an image capturing range of a second image capturing apparatus that is used for generating the virtual viewpoint image; output the virtual viewpoint image or an image captured by the first image capturing apparatus; and perform control so that the image captured by the first image capturing apparatus is output in a case where a position of the first image capturing apparatus specified by the second viewpoint information is included in a field of view of the virtual viewpoint specified by the first viewpoint information, the position of the first image capturing apparatus.

Further features of the present disclosure will become apparent from the following description of exemplary embodiments with reference to the attached drawings.

BRIEF DESCRIPTION OF THE DRAWINGS

FIG. 5 is a diagram for explaining a viewpoint comparison table;

DESCRIPTION OF THE EMBODIMENTS

In the following, with reference to the attached drawings, details of the technique of the present disclosure are explained based on embodiments.

First Embodiment

[Configuration of Image Processing System]

Figure 1:
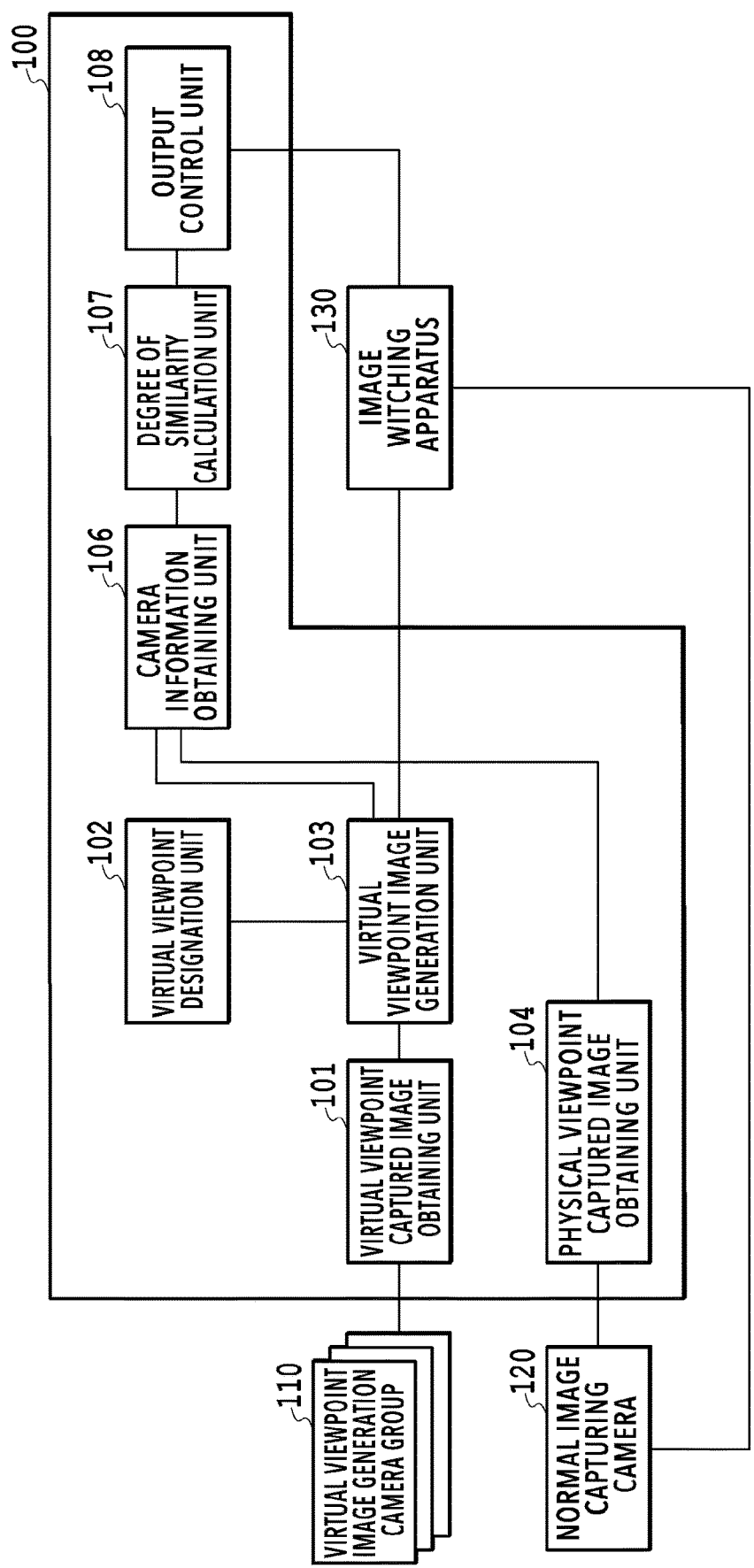
FIG. 1 a block diagram showing a function configuration of an image processing apparatus.

FIG. 1 is a configuration diagram showing the entire image processing system of the present embodiment. The image processing system has a virtual viewpoint image generation camera group 110, a normal image capturing camera 120, an image processing apparatus 100, and an image switching apparatus 130.

The image processing apparatus 100 of the present embodiment is an information processing apparatus capable of generating a virtual viewpoint image. The virtual viewpoint image is an image representing an appearance from a viewpoint (called virtual viewpoint) different from the viewpoint of a camera that is installed actually and is also called a free-viewpoint image or an arbitrary viewpoint image. The virtual viewpoint image may be a moving image or a still image. In the present embodiment, explanation is given on the assumption that the virtual viewpoint image is a moving image.

In the present embodiment, there is a case where explanation is given by replacing the virtual viewpoint with a virtual camera. At this time, the position of the virtual viewpoint corresponds to the position of the virtual camera and the view direction from the virtual viewpoint corresponds to the direction of the orientation of the virtual camera, respectively. Further, the virtual viewpoint image corresponds to a captured image obtained by a virtual camera virtually performing image capturing. It is possible for an operator of the virtual camera to designate the position and orientation of the virtual camera. Because of this, it is made possible to generate an image from an arbitrary viewpoint.

The virtual viewpoint image in the present embodiment is also called a free-viewpoint image, but the virtual viewpoint image is not limited to the image corresponding to the viewpoint designated freely (arbitrarily) by a user and for example, the image corresponding to the viewpoint selected by a user from a plurality of candidates is also included in the virtual viewpoint image. Further, in the present embodiment, a case is explained mainly where the designation of a virtual viewpoint is performed by a user operation, but it may also be possible for the designation of a virtual viewpoint to be performed automatically based on image analysis results and the like.

The image processing apparatus 100 has a virtual viewpoint captured image obtaining unit 101, a virtual viewpoint designation unit 102, a virtual viewpoint image generation unit 103, a physical viewpoint captured image obtaining unit 104, a camera information obtaining unit 106, a degree of similarity calculation unit 107, and an output control unit 108.

The virtual viewpoint captured image obtaining unit 101 obtains captured images in accordance with the viewing angle of each camera, which are obtained by the virtual viewpoint image generation camera group 110, a plurality of image capturing apparatuses arranged so as to surround an image capturing area, such as a studio, performing image capturing in time synchronization. The number of cameras constituting the virtual viewpoint image generation camera group 110 and the arrangement of the cameras are not limited.

The virtual viewpoint designation unit 102 generates viewpoint information on a virtual camera, which at least specifies the position and orientation of the virtual camera, which are specified by an operator of the virtual camera.

It is possible for the operator of the virtual camera to specify the position, orientation and the like of a desired virtual camera via an operation unit (not shown schematically) connected with the image processing apparatus 100. The operation unit (not shown schematically) is a device, for example, such as a joystick, but the operation unit (not shown schematically) is not limited to the joystick. In addition thereto, the operation unit (not shown schematically) may be a device, such as a mouse and a keyboard, which is used for the operation of a personal computer.

It is assumed that the viewpoint information on the virtual camera includes a three-dimensional position (position of virtual camera) on the world coordinates, the orientation (orientation of virtual camera), the focal length, and the principal point (center on virtual camera image). By the viewpoint information on the virtual camera being generated, the position, orientation and the like of the virtual camera are specified.

The virtual viewpoint image generation unit 103 generates a virtual viewpoint image representing an appearance from the virtual camera designated by the virtual viewpoint designation unit 102 by using the plurality of captured images obtained by the virtual viewpoint captured image obtaining unit 101 and the positional relationship of the virtual viewpoint image generation camera group 110. Then, the virtual viewpoint image generation unit 103 outputs the image within the viewing angle of the virtual camera as the virtual viewpoint image.

Here, as an example of the generation method of a virtual viewpoint image, a method of generating a virtual viewpoint image is explained, in which a three-dimensional model representing a three-dimensional shape of an object is generated and a two-dimensional image in a case where the three-dimensional model is viewed from the virtual camera is represented by the projection operation. The three-dimensional model representing the three-dimensional shape of an object is also called three-dimensional shape data.

First, based on the captured images of and the arrangement information on the virtual viewpoint image generation camera group 110, the three-dimensional model of an object within the image capturing range is generated. As the method of configuring a three-dimensional model, there is a method called the visual volume intersection method or Visual Hull (in the following, described as Visual Hull). In Visual Hull, the silhouette of the object on the captured image of each virtual viewpoint image generation camera is virtually back-projected in the object direction from the optical principal point position of the virtual viewpoint image generation camera. As a result of that, a pyramid area whose vertex is the optical principal point position and whose section is the silhouette of the object is formed. Then, by taking the overlapping areas (logical product) of the pyramid area formed for each virtual viewpoint image generation camera as a three-dimensional model, the three-dimensional model of the object is generated.

Next, among the cameras constituting the virtual viewpoint image generation camera group 110, the camera having captured the captured image that is used for coloring of the three-dimensional model is determined and rendering processing to perform appropriate coloring for the three-dimensional model is performed. As the method of processing to determine the camera that is used for coloring, for example, there is a method of determining the camera based on a distance image by generating the distance image representing the distance from each virtual viewpoint image generation camera to each point constituting the three-dimensional model. By selecting which virtual viewpoint image generation camera whose color of the captured image is used by utilizing the distance image, coloring is performed.

The method of generating a virtual viewpoint image is not limited to the above-described method. As the method of generating a virtual viewpoint image, it may also be possible to use an image-based image processing method, such as morphing or billboarding, in place of the method of generating a three-dimensional model.

Explanation is given on the assumption that the generation processing of a virtual viewpoint image is performed in the image processing apparatus 100, which is a computer device connected to a network, by aggregating the image data that is sent form the virtual viewpoint image generation camera group 110 in the image processing apparatus 100. It is assumed that the network connection is Ethernet (registered trademark) that is used most generally in the computer network, but the network connection is not limited to Ethernet (registered trademark). The image processing apparatus 100 is implemented by an apparatus, such as a personal computer, a work station, and a server. However, depending on the virtual viewpoint image that is generated, the calculation capability required for a computer device is different, and therefore, the aspect of the image processing apparatus 100 is not limited to the above-described aspect. In addition, for example, it may also be possible to constitute the image processing apparatus 100 by a plurality of apparatuses and perform the necessary image generation processing by allocating it to the plurality of apparatuses. In a case where the image processing apparatus 100 is constituted by a plurality of apparatuses, the connection of the plurality of apparatuses is performed so that it is made possible to perform transmission and reception of data by the network connection described previously.

The physical viewpoint captured image obtaining unit 104 obtains an actual captured image obtained by the normal image capturing camera 120 performing image capturing. The normal image capturing camera 120 is an actual image capturing apparatus that is arranged within the image capturing range of the virtual viewpoint image generation camera group 110.

There is a case where the virtual viewpoint image is not suitable to the representation of the expression of a person in the zoom-in state. Because of this, the normal image capturing camera 120 is used for obtaining an image in which the ratio of the object within the viewing angle is high compared to the virtual viewpoint image generation camera group 110. For example, in a case where the object is a person, the normal image capturing camera 120 is arranged for the purpose of capturing the expression of a person and the like.

The normal image capturing camera 120 is, for example, a hand-held camera for a cameraman to perform image capturing, or a camera that is installed on a tripod or on an image capturing crane. The image processing apparatus 100 and the normal image capturing camera 120 are connected by, for example, an SDI (Serial Digital Interface) cable. The SDI is the interface standard that is mainly used for the business video device. In the present embodiment, explanation is given on the assumption that the normal image capturing camera 120 is a hand-held image capturing apparatus for a cameraman to perform image capturing.

The camera information obtaining unit 106 obtains viewpoint information specifying the virtual camera from the virtual viewpoint image generation unit 103. The viewpoint information representing the position and orientation of the virtual camera is output from the virtual viewpoint designation unit 102 to the virtual viewpoint image generation unit 103 and used for generating a virtual viewpoint image. Because of this, it is possible for the camera information obtaining unit 106 to obtain the viewpoint information on a virtual camera 304 from the virtual viewpoint image generation unit 103.

Further, the camera information obtaining unit 106 obtains the viewpoint information representing the position and orientation of the normal image capturing camera 120 as the information on the normal image capturing camera 120 from the physical viewpoint captured image obtaining unit 104.

The obtaining method of each piece of viewpoint information of the camera information obtaining unit 106 described above is an example and it may also be possible for the camera information obtaining unit 106 to directly obtain the view point information on the virtual camera from the virtual viewpoint designation unit 102. Further, it may also be possible for the camera information obtaining unit 106 to directly obtain the viewpoint information on the normal image capturing camera 120 from the normal image capturing camera 120. In that case, the camera information obtaining unit 106 obtains the viewpoint information from the normal image capturing camera 120 by the Ethernet connection described previously.

It is made possible to obtain the viewpoint information on the normal image capturing camera 120 by mounting a sensor device capable of detecting the position and orientation on the normal image capturing camera 120. Alternatively, it may also be possible to obtain the positional information on the normal image capturing camera 120 based on reflection from markers obtained by installing in advance the markers in the space in which the normal image capturing camera 120 can move and casting the infrared ray. Further, it may also be possible to obtain the orientation information on the normal image capturing camera 120 by using an acceleration sensor, a gyrosensor and the like at the same time.

The position and orientation of the normal image capturing camera 120 are adjusted in advance so that the positional relationship is the same as that of the world coordinates used in the virtual viewpoint image generation unit 103. By performing this adjustment, the viewpoint information on the normal image capturing camera 120 is obtained as the information representing the position and orientation in the world coordinate system common to the viewpoint information on the virtual camera. As the method of adjusting the position and orientation in the world coordinate system, for example, the setting is performed so that the virtual camera and the normal image capturing camera 120 have the same viewing angle. Then, from the relationship between the world coordinates at that time and the coordinates of the normal image capturing camera 120, it is possible to adjust the viewpoint information on the normal image capturing camera 120 so as to match with the world coordinates. Alternatively, by arranging in advance the normal image capturing camera 120 at the position corresponding to the location on the world coordinates, it is possible to perform adjustment from the relationship between the coordinates of the normal image capturing camera 120 and the world coordinates.

The degree of similarity calculation unit 107 calculates the value to determine similarity (the degree of similarity) for determining whether the viewpoint of the virtual camera and the viewpoint of the normal image capturing camera 120 are similar based on the viewpoint information obtained by the camera information obtaining unit 106. Details will be described later.

The output control unit 108 gives instructions to the image switching apparatus 130 so that the output control in accordance with the degree of similarity calculated by the degree of similarity calculation unit 107 is performed. For example, in a case where it is determined that the viewpoints are similar based on the degree of similarity, the image switching apparatus 130 is instructed to output an image by the output control in accordance with that the viewpoints are similar. Details will be described later.

The image switching apparatus 130 obtains a virtual viewpoint image from the image processing apparatus 100. Further, the image switching apparatus 130 obtains the captured image of the normal image capturing camera 120, which corresponds to its virtual viewpoint image, from the normal image capturing camera 120. The image switching apparatus 130 obtains the virtual viewpoint image and the captured image via the SDI cable. The image switching apparatus 130 is an output apparatus (output unit) that outputs one of the obtained images. The image that is output from the image switching apparatus 130 is displayed on the display unit that a viewer is watching. Specifically, the image switching apparatus 130 outputs one of the virtual viewpoint image and the captured image which are obtained to a broadcast facility, a distribution server or the like, not shown schematically.

In the present embodiment, the image switching apparatus 130 performs control so that the captured image obtained by capturing an object in a state where the zoom magnification is high with the normal image capturing camera 120 or the virtual viewpoint image from a desired virtual viewpoint is displayed on the display unit by being switched appropriately. By displaying the captured image of the normal image capturing camera 120 and the virtual viewpoint image while switching between them, it is made possible to provide a viewer with an image whose feeling of being at a live performance is higher. That is, it is made possible to appropriately display the image that captures the expression while making an effective use of the feature of the virtual viewpoint image whose degree of flexibility is high.

The image switching apparatus 130 is implemented by, for example, an apparatus called a switcher. Normally, by operating the switch provided in the switcher, the images that are output by a user are switched. In the present embodiment, based on the instructions of the output control unit 108 of the image processing apparatus 100, in addition to the switching instructions by a user, the switching of output images of the image switching apparatus 130 is controlled.

Explanation is given on the assumption that each function unit that is implemented in the image processing apparatus 100 shown in FIG. 1 is implemented by the CPU 201 (see FIG. 2) of the image processing apparatus, to be described later, executing a predetermined program, but this is not limited. For example, it may also be possible to utilize hardware for increasing the speed of the operation, such as a GPU (Graphics Processing Unit) and an FPGA (Field Programmable Gate Array). That is, each function unit of the image processing apparatus 100 may be implemented in cooperation between software and hardware, such as a dedicated IC, or part or all of the functions may be implemented by hardware alone. Further, it may also be possible to use a configuration in which the processing of each function unit is performed in a distributed manner by using a plurality of the image processing apparatuses 100.

[Hardware Configuration of Image Processing Apparatus]

Figure 2:
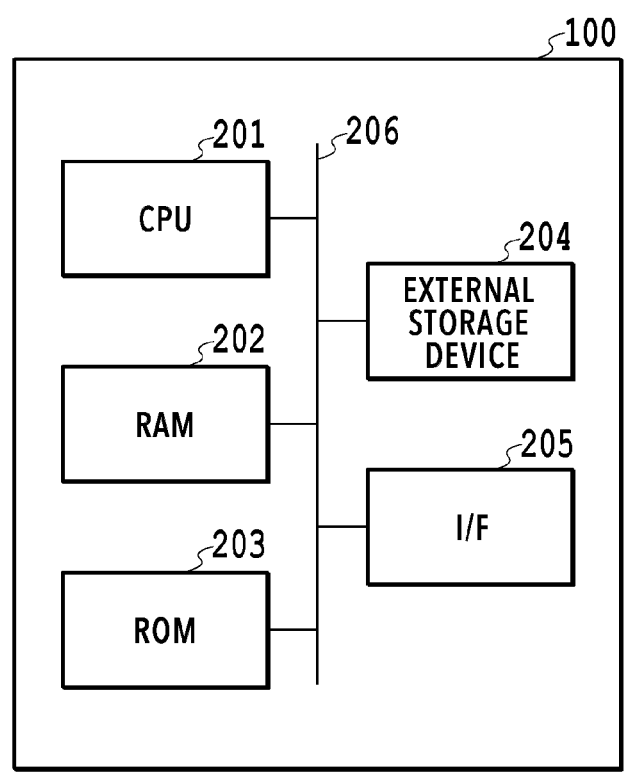
FIG. 2 is a block diagram showing a configuration example of hardware of the image processing apparatus.

FIG. 2 is a block diagram showing a configuration example of hardware of the image processing apparatus 100. The image processing apparatus 100 has a CPU 201, a RAM 202, a ROM 203, an external storage device 204, and an I/F 205.

The CPU 201 performs control of the entire computer by using computer programs and data stored in the RAM 202 and the ROM 203.

The RAM 202 has an area for temporarily storing computer programs, data loaded from the external storage device 204, data obtained from the outside via the I/F (interface) 205, and the like. Further, the RAM 202 has a work area that is used by the CPU 201 at the time of performing various kinds of processing. That is, for example, it is possible to allocate the RAM 202 as a frame memory, it is possible for the RAM 202 to appropriately provide other various areas, and so on. In the ROM 203, the setting data, the boot program and the like of the present computer are stored.

The external storage device 204 is a large-capacity information storage device represented by a hard disk drive device. In the external storage device 204, the OS (Operating System) and computer programs for causing the CPU 201 to implement each function of the image processing apparatus 100 shown in FIG. 1 are stored. Further, it may also be possible for the external storage device 204 to store processing-target image data. The computer programs and data stored in the external storage device 204 are loaded appropriately onto the RAM 202 in accordance with the control by the CPU 201 and taken as the target of the processing by the CPU 201.

The I/F 205 is an interface for connecting to a network, such as a LAN and the internet, and it is possible for the image processing apparatus 100 to obtain or transmit various kinds of information via the I/F 205. Further, it is possible for the image processing apparatus 100 to connect a display unit, an operation unit, ad another device, not shown schematically, via the I/F 205. A bus 206 is a bus for connecting each of the above-described units.

The display unit (not shown schematically) includes, for example, a liquid crystal display, an LED and the like and displays a GUI (Graphical User Interface) for a user to operate the image processing apparatus 100, and the like. The operation unit (not shown schematically) includes, for example, a keyboard, a mouse, a joystick, a touch panel and the like and inputs various instructions to the CPU 201 upon receipt of the operation by a user. The CPU 201 also operates as the display control unit configured to control the display unit and as the operation control unit configured to control the operation unit.

The hardware configuration of the image switching apparatus 130 is the same as that in FIG. 2, and therefore, explanation is omitted.

[About Arrangement of Cameras]

Figure 3:
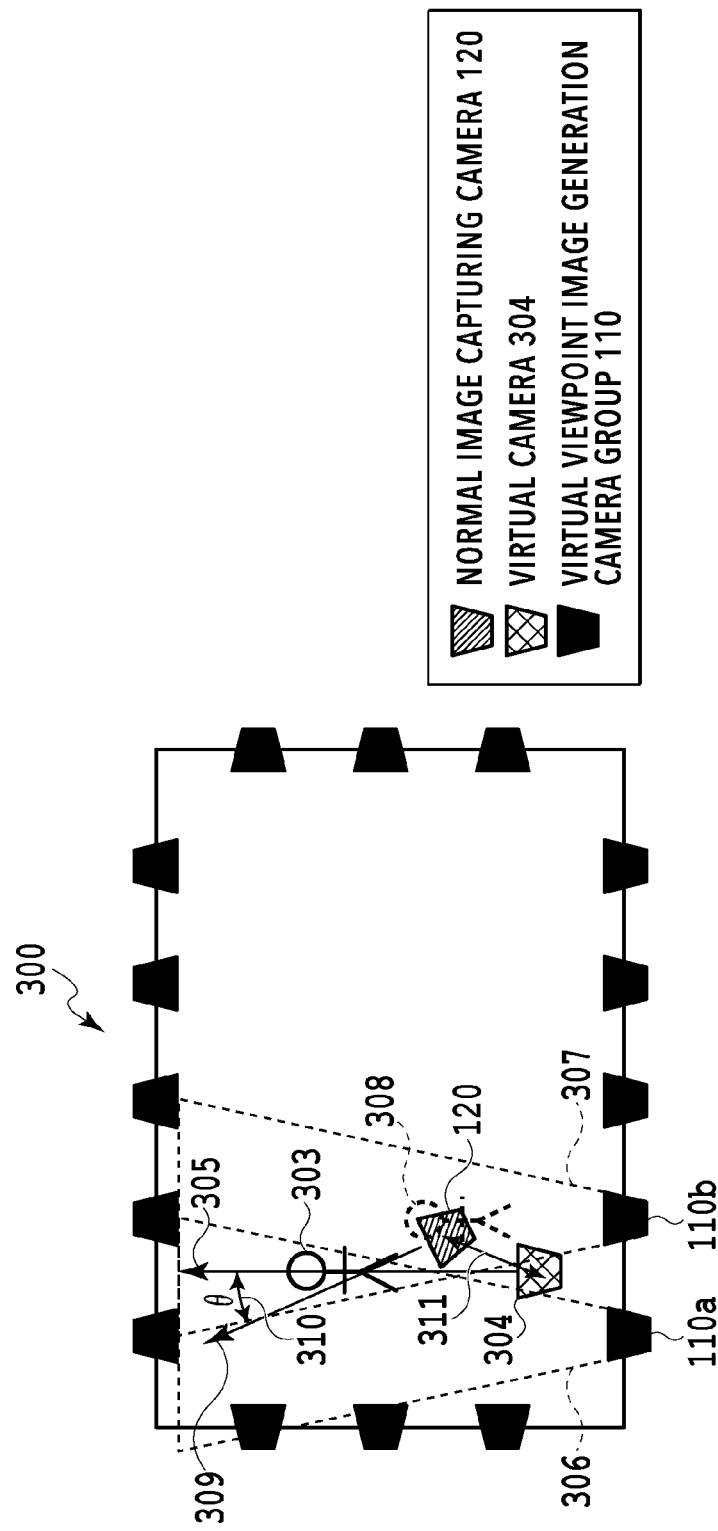
FIG. 3 is a diagram for explaining an image capturing range of a virtual viewpoint image generation camera group.

FIG. 3 is a diagram showing a state in a case where an image capturing range 300 of the virtual viewpoint image generation camera group 110 is viewed from a bird's eye. For example, the image capturing range 300 is a studio in which an object 303, such as a singer and a dancer, gives performance. As shown in FIG. 3, the virtual viewpoint image generation camera group 110 is arranged around the studio and captures the studio in time synchronization from a variety of angles. As a result of that, captured images from a plurality of viewpoints are obtained.

Further, in the image capturing range 300, the normal image capturing camera 120 and a cameraman 308 performing image capturing by using the normal image capturing camera 120 exist. That is, in the studio, image capturing by the normal image capturing camera 120 and image capturing by the virtual viewpoint image generation camera group 110 are performed at the same time.

The normal image capturing camera 120 exists in the image capturing range of at least one of the cameras constituting the virtual viewpoint image generation camera group 110. Because of this, depending on the position of the normal image capturing camera 120, there is a possibility that the normal image capturing camera 120 is included as an object within the viewing angle of one or more cameras of the cameras constituting the virtual viewpoint image generation camera group 110.

The virtual camera 304 in FIG. 3 represents the position and orientation of the virtual camera, which are designated by the operator of the virtual camera. A direction 305 represents the direction of the orientation of the virtual camera 304 two-dimensionally. In this case, on a condition that a virtual viewpoint image is generated from the virtual camera 304, a virtual viewpoint image in which the normal image capturing camera 120 and the cameraman 308 are included is generated, in addition to the original object 303. In this case, for example, there is a possibility that the normal image capturing camera 120 and the cameraman 308 are obstructions, and therefore, sometimes, processing to prevent the normal image capturing camera 120 and the cameraman 308 from being represented within the virtual viewpoint image is required.

For example, a method of generating a virtual viewpoint image so that the normal image capturing camera 120 and the cameraman 308 are not included is conceivable by generating the virtual viewpoint image by not using the data of a camera whose viewing angle includes the normal image capturing camera 120 and the cameraman 308, of the cameras constituting the virtual viewpoint image generation camera group 110. FIG. 3 shows that a viewing angle 307 of a camera 110b constituting the virtual viewpoint image generation camera group 110 includes the normal image capturing camera 120 and the cameraman 308. Because of this, in the example in FIG. 3, it is considered that a virtual viewpoint image is generated by excluding the data of the camera 110b. However, the viewing angle 307 of the camera 110b includes the object 303 as well. In a case where a virtual viewpoint image is generated by not using the data of the camera 110b having captured the object 303, there is a possibility that the quality of the virtual viewpoint image is reduced.

Further, there is also a case where the cameraman 308 performs image capturing while moving frequently. In this case, even on a condition that the object 303 is at rest, the camera that is used for generation of a virtual viewpoint image changes for several frames. Because of this, in a case where it is no longer possible to use the data of the camera 110*b* having captured the object 303, a change in the virtual viewpoint image occurs in each frame and a viewer may feel that the appearance is not natural at the time of displaying the virtual viewpoint image in a moving image.

Consequently, in the present embodiment, based on the viewpoint information representing the position and orientation of the virtual camera and the viewpoint information representing the position and orientation of the normal image capturing camera 120, whether their viewpoints are similar is determined. A method of performing control so that the captured image of the normal image capturing camera 120 is output in a case where the viewpoints are similar is explained. By performing the control such as this, it is possible to suppress a person such as a cameraman other than the original object from being displayed while providing an image from the virtual camera.

In FIG. 3, for simplification of explanation, the example of a case where the image capturing target is handled two-dimensionally, such as that the image capturing target is viewed from a bird's eye, but it is also possible to cope with a case where parameters are handled three-dimensionally.

[About Degree of Similarity]

The degree of similarity calculation unit 107 calculates a degree of similarity which is a value representing the degree of similarity between the virtual viewpoint, the viewpoint of the virtual camera 304, and the viewpoint of the normal image capturing camera 120 based on the viewpoint information on the virtual camera 304 and the viewpoint information on the normal image capturing camera 120. By using FIG. 3, an example of calculation of a degree of similarity is explained.

In FIG. 3, a direction 309 represents the direction of the orientation of the normal image capturing camera 120 two-dimensionally. Further, the direction 305 represents the direction of the orientation of the virtual camera 304 two-dimensionally. An angle θ 310 indicates the difference between the orientation of the virtual camera 304 and the orientation of the normal image capturing camera 120 (angle formed by the direction 305 and the direction 309). A distance 311 indicates the distance from the position of the virtual camera 304 to the position of the normal image capturing camera 120. In the present embodiment, the distance 311 and the angle 310 are calculated as the degree of viewpoint similarity. Each of the distance 311 and the angle 310 is calculated based on the viewpoint information.

By comparing the calculated degree of similarity and a threshold value determined in advance, it is possible to determine whether the viewpoint of the virtual camera 304 and the viewpoint of the normal image capturing camera 120 are similar. In the present embodiment, in a case where the distance 311 is smaller than a first threshold value determined in advance and the angle 310 is smaller than a second threshold value determined in advance, it is determined that the viewpoint of the virtual camera 304 and the viewpoint of the normal image capturing camera 120 are similar.

[About Image Output Control]

Figure 4:
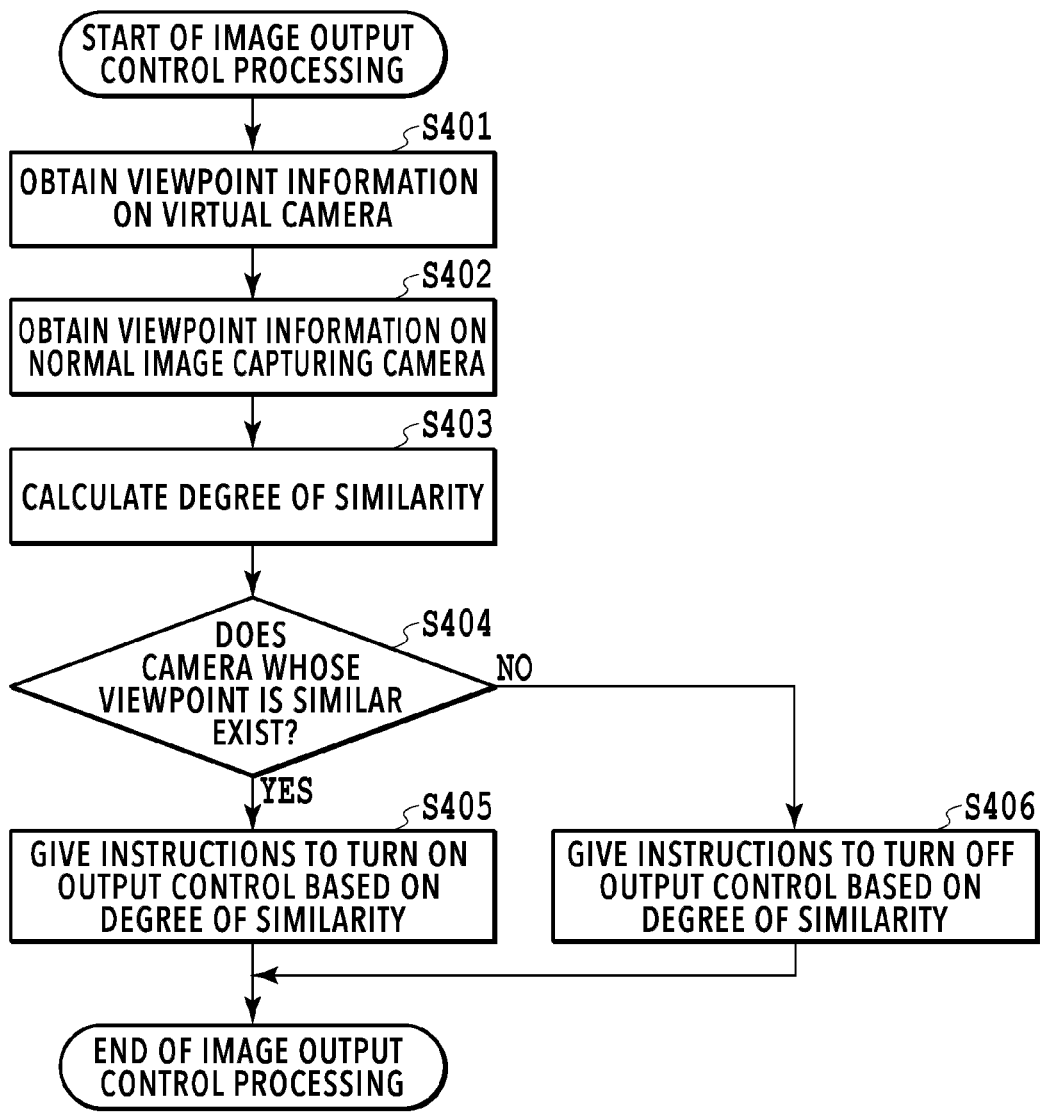
FIG. 4 is a flowchart showing an example of image output control processing.

FIG. 4 is a flowchart for explaining a flow of image output control processing. The series of processing shown in the flowchart in FIG. 4 is performed by the CPU 201 of the image processing apparatus 100 loading a program code stored in the ROM 203 onto the RAM 202 and executing the program code. It may also be possible to implement part or all of the functions at the steps in FIG. 4 by hardware, such as an ASIC and an electronic circuit. Symbol "S" in the explanation of each piece of processing means that the step is a step in this flowchart and this also applies to subsequent flowcharts.

Explanation is given on the assumption that generation of a virtual viewpoint image is performed in parallel to the processing of the flowchart in FIG. 4, but it may also be possible to generate in advance virtual viewpoint images corresponding to all the frames before the start of the flowchart in FIG. 4.

At S401, the camera information obtaining unit 106 obtains viewpoint information (first viewpoint information) representing the position and orientation of the virtual camera from the virtual viewpoint image generation unit 103. At this step, the viewpoint information on the virtual camera is obtained, which corresponds to the virtual viewpoint image that is output in a case where the image switching apparatus 130 switches the output to the virtual camera. The image output control processing is performed repeatedly, and therefore, in a case where the processing at this step is performed next, the viewpoint information on the virtual camera corresponding to the virtual viewpoint image that is output next is obtained.

At S402, the camera information obtaining unit 106 obtains viewpoint information (second viewpoint information) representing the position and orientation of the normal image capturing camera 120. The viewpoint information that is obtained at this step is the viewpoint information on the normal image capturing camera 120 at the time of obtaining the captured image corresponding to the virtual viewpoint image at S401. For example, the viewpoint information on the normal image capturing camera 120 performing image capturing at the same time as the time of the virtual viewpoint image based on the virtual viewpoint obtained at S401 is obtained.

At S403, the degree of similarity calculation unit 107 calculates the degree of similarity between the two viewpoints based on the viewpoint information on the normal image capturing camera 120 and the viewpoint information on the virtual camera, which are each the obtained viewpoint information. As described previously, in the present embodiment, as the degree of similarity, the angle indicating the difference between the orientation of the virtual camera and the orientation of the normal image capturing camera 120 and the distance between the position of the virtual camera and the position of the normal image capturing camera 120 are calculated.

At S404, the output control unit 108 determines whether the viewpoint of the normal image capturing camera 120 and the viewpoint of the virtual camera are similar based on the degree of similarity derived at S403. In a case where there is a plurality of the normal image capturing cameras 120, whether the normal image capturing camera 120 whose viewpoint is similar to that of the virtual camera exists is determined. Then, in accordance with the results of the determination, the processing is switched.

In a case where it is determined that the normal image capturing camera 120 whose virtual viewpoint is similar exists (YES at S404), the processing advances to S405 and the output control unit 108 instructs the image switching apparatus 130 to turn ON the output control based on the degree of similarity.

The output control based on the degree of similarity is the control to automatically switch the image that is output to the captured image of the normal image capturing camera 120. Further, the output control based on the degree of similarity is the control to output the captured image of the normal image capturing camera 120 without receiving the instructions of a user even though the user gives instructions to switch the image that is output to the virtual viewpoint image in a case where the captured image of the normal image capturing camera 120 has already been output. Because of this, it is possible to output and display the image whose viewing angle is similar to that of the virtual viewpoint image and in which the normal image capturing camera 120 and the cameraman 308 are not included.

On the other hand, in a case where it is determined that the normal image capturing camera 120 whose virtual viewpoint is similar does not exist (NO at S404), the processing advances to S406 and the output control unit 108 instructs the image switching apparatus 130 to turn OFF the output control based on the degree of similarity. Because of this, the image switching apparatus 130 outputs the image in accordance with the switching instructions of a user.

The image processing apparatus 100 continuously performs the processing at S401 to S406 described above for a predetermined time of period at predetermined cycles (predetermined time intervals) determined in advance. That is, in a case where frames corresponding to a predetermined number are output, the processing at S401 to S406 are performed again and for the output of the next frames corresponding to a predetermined number, determination to give instructions to turn ON or OFF the output control based on the degree of similarity is performed. The shorter the time interval at which S401 to S406 are performed next, that is, the higher the frequency of the processing to determine whether to turn ON or OFF the output control based on the degree of similarity, the higher the adaptability for the movement of the virtual camera and normal image capturing camera 120 is, but the calculation load becomes high.

There is a case where a plurality of virtual cameras is designated and there is a case where a plurality of normal image capturing cameras exists. In the case such as this, it is also possible to perform the control of the present embodiment.

FIG. 5 is a diagram showing a viewpoint comparison table 500 showing the results of comparing each viewpoint in a case where a plurality of virtual camera exists and a plurality of normal image capturing cameras exist. The viewpoint comparison table in FIG. 5 shows a viewpoint comparison table in a case where four virtual cameras 1 to 4 and two normal image capturing cameras 1 to 2 exist. In a case where a plurality of virtual cameras exists, the degree of similarity calculation unit 107 calculates the degree of viewpoint similarity with the normal image capturing camera for each virtual camera. Then, the output control unit 108 compares the degree of similarity and a threshold value and determines whether the viewpoint of the virtual camera and the viewpoint of the normal image capturing camera are similar, respectively, and stores the results in the viewpoint comparison table.

The output control unit 108 gives instructions to the image switching apparatus 130 so that the output control in accordance with the viewpoint comparison table 500 is performed as the output control based on the degree of similarity. For example, in the flowchart in FIG. 4, after the degree of similarity is calculated at S403, at S404, the output control unit 108 generates the viewpoint comparison table 500 and whether the normal image capturing camera similar to the virtual camera exists is determined. In a case where it is determined that the normal image capturing camera 120 similar to the virtual camera exists, at S405, instructions are given to the image switching apparatus 130 so that the output control in accordance with the viewpoint comparison table 500 is performed as the output control based on the degree of similarity. It may also be possible for the output control unit 108 to generate the viewpoint comparison table 500 and give instructions to the image switching apparatus 130 so that the output control in accordance with the viewpoint comparison table 500 is performed as the output control based on the degree of similarity in place of the processing at S404 to S406.

An example of the output control in accordance with the viewpoint comparison table 500, which is performed in the image switching apparatus 130, is explained based on FIG. 5. As shown in FIG. 5, for the viewpoint of the virtual camera 1, it is determined that the viewpoint of the normal image capturing camera 1 is similar but the viewpoint of the normal image capturing camera 2 is not similar. In this situation, in a case where a user gives instructions to output the virtual viewpoint image corresponding to the virtual camera 1, the image switching apparatus 130 performs the output control to automatically switch the output to the captured image of the normal image capturing camera 1 whose viewpoint is similar to that of the virtual camera 1. Further, the image switching apparatus 130 performs the output control so that it is possible to switch from the normal image capturing camera 1 to the normal image capturing camera 2 at any timing of a user.

In a case where a user gives instructions to output the virtual viewpoint image corresponding to the virtual camera 2, the image switching apparatus 130 performs the output control to automatically switch the output to the captured image of the normal image capturing camera 2 whose viewpoint is similar to that of the virtual camera 2. Further, the image switching apparatus 130 performs the output control so that it is possible to switch from the captured image of the normal image capturing camera 2 to the captured image of the normal image capturing camera 1 at any timing of a user.

It is determined that the viewpoint of the virtual camera 3 is not similar to those of both the normal image capturing cameras. In this situation, in a case where a user gives instructions to output the virtual viewpoint image corresponding to the virtual camera 3, the image switching apparatus 130 performs the output control so that the output is switched to the virtual viewpoint image of the virtual camera 3 at any timing of a user.

The viewpoint of the virtual camera 4 is similar to those of both the normal image capturing cameras. In this situation, in a case where a user gives instructions to output the virtual viewpoint image corresponding to the virtual camera 4, the image switching apparatus 130 performs the output control to automatically switch the output to the captured image of one of the normal image capturing cameras. As regards to which of the captured images of the normal image capturing camera 1 and the normal image capturing camera 2 the output is switched, it is sufficient to set priority in advance to the normal image capturing camera and switch the output to the captured image of the camera whose priority is higher. Alternatively, in place of determining whether or not the viewpoint is similar, it may also be possible to determine the normal image capturing camera whose viewpoint is more similar to that of the virtual camera based on the degree of similarity and switch the output to the captured image of the determined camera. For example, the output is switched to the captured image of the normal image capturing camera whose distance to the virtual camera is smaller.

As explained above, according to the present embodiment, in a case where the virtual viewpoint image and the captured image of the normal image capturing camera are switched and output, even on a condition that the cameraman or the like is included within the viewing angle of the virtual camera, it is made possible to suppress a reduction in quality of an image that is displayed.

In the explanation described above, the method is explained in which the degree of similarity that is used to determine whether the viewpoint of the virtual camera and the viewpoint of the normal image capturing camera are similar is calculated from the viewpoint information representing the position and orientation of the camera. In addition to this, it may also be possible to determine whether the viewpoint of the virtual camera and the viewpoint of the normal image capturing camera are similar based on the degree of image similarity between the virtual viewpoint image and the captured image of the normal image capturing camera.

For example, the camera information obtaining unit 106 obtains the virtual viewpoint image from the virtual viewpoint image generation unit 103 and the captured image of the normal image capturing camera from the physical viewpoint captured image obtaining unit 104. The camera information obtaining unit 106 outputs the obtained virtual viewpoint image and the captured image to the degree of similarity calculation unit 107. The degree of similarity calculation unit 107 calculates the degree of image similarity from the image data of the virtual viewpoint image and the captured image of the normal image capturing camera. In a case where the degree of image similarity exceeds a threshold value determined in advance, the output control unit 108 determines that the viewpoints are similar. The method of the output control in a case where it is determined that the viewpoints are similar is the same as the method described above.

As the calculation method of a degree of image similarity, for example, there is a method of extracting feature points on the image and calculating the degree of matching of the feature points as the degree of similarity. Alternatively, it may also be possible to calculate the degree of similarity by making it possible in advance to recognize an object by the method of machine learning, performing recognition of an object from each of the virtual viewpoint image and the captured image of the normal image capturing camera, and comparing the positional relationship between the objects. Those calculation methods of a degree of similarity are examples and m the present embodiment, the method of calculating the degree of image similarity is not limited.

Further, it may also be possible to determine whether viewpoints are similar by combining the degree of viewpoint similarity based on the viewpoint information on the virtual camera described previously and the viewpoint information on the normal image capturing camera and the degree of image similarity between the virtual viewpoint image and the captured image of the normal image capturing camera. For example, in the image processing apparatus 100, the load to calculate the degree of image similarity is high compared to the load to calculate the degree of viewpoint similarity. Because of this, for example, only in a case where it is determined that the distance 311 is smaller than the first threshold value determined in advance and the angle 310 is smaller than the second threshold value determined in advance based on the viewpoint information, the degree of image similarity is further calculated. Then, in a case where the degree of image similarity is higher than a predetermined threshold value, it may be possible to determine that the viewpoints are similar. By determining whether the viewpoints are similar in two stages as described above, it is possible to improve the accuracy of the determination of whether the viewpoints are similar while suppressing the load.

Second Embodiment

In the first embodiment, the method of performing control so that the captured image of the normal image capturing camera is output as the output control that is performed by the output control unit 108 in a case where the normal image capturing camera whose viewpoint is similar to the that of virtual camera exists is explained. In the present embodiment, a method is explained in which, in a case where the normal image capturing camera whose viewpoint is similar to that of the virtual camera exists, a user whose switches the image that is output by operating the switch of the image switching apparatus 130 is informed of that. The present embodiment is explained by mainly taking differences from the first embodiment. The portions that are not described explicitly in particular are the same configuration and processing as those of the first embodiment.

In the present embodiment, a case is explained where the two virtual cameras, that is, the virtual camera 1 and the virtual camera 2 are designated and the two cameras, that is, the normal image capturing camera 1 and the normal image capturing camera 2 exit.

Figure 6:
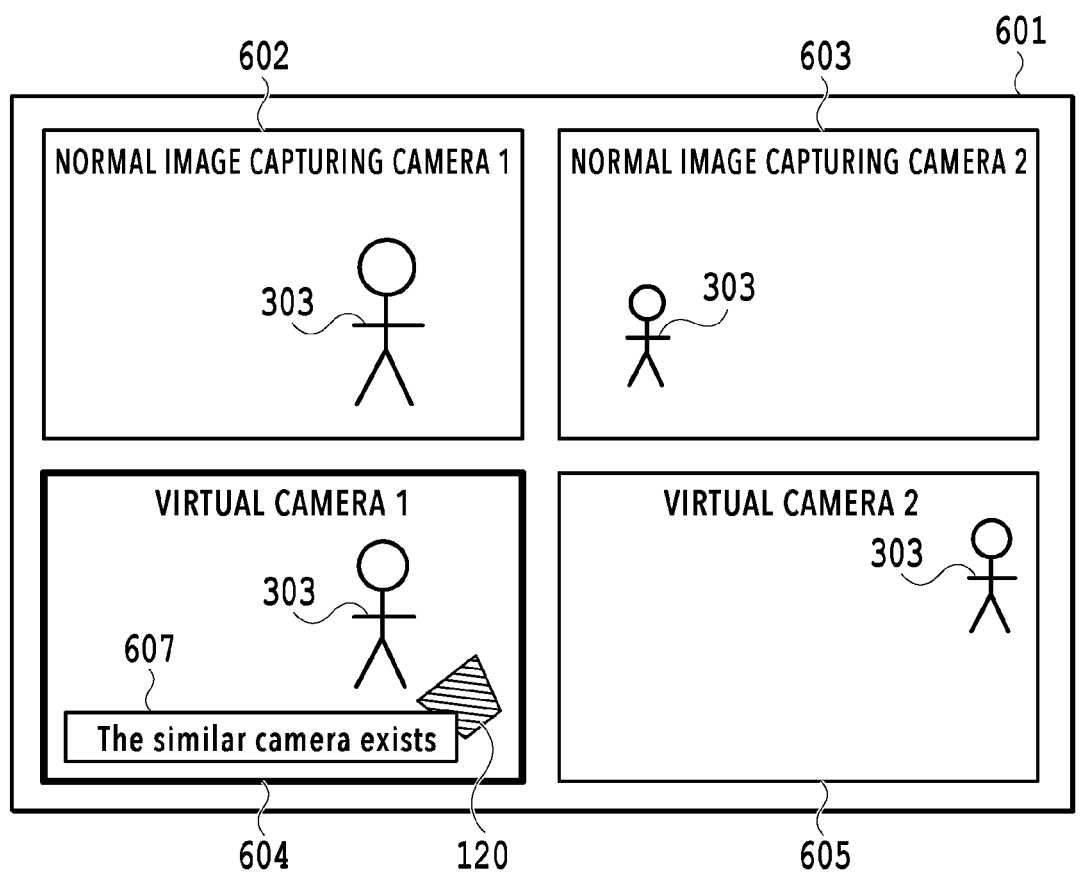
FIG. 6 is a diagram for explaining a display screen for a user to perform a switching operation of an output image.

FIG. 6 is a diagram showing a screen 601 that a user of the image switching apparatus 130 can view and which is displayed on the display unit (not shown schematically). It is assumed that the display unit, not shown schematically, on which the screen 601 is displayed is connected to the image switching apparatus 130.

On the screen 601, screens 602 to 605 on which the virtual viewpoint images and the captured images at the same time are displayed are included. For example, in a case of the state where the object 303 are captured at the same time by the four cameras, that is, the two virtual cameras and the two normal image capturing cameras, the screen 601 is displayed on a display unit (not shown schematically) of the image switching apparatus 130. It is possible for a user who switches the images that the image switching apparatus 130 outputs to switch the images so that the image is output by selecting the image while viewing the screen 601.

The screen 602 is a screen for displaying the captured image obtained by the normal image capturing camera 1 performing image capturing. The screen 603 is a screen for displaying the captured image obtained by the normal image capturing camera 2 performing image capturing. The screen 604 is a screen for displaying the virtual viewpoint image representing the appearance from the virtual camera 1. The screen 605 is a screen for displaying the virtual viewpoint image representing the appearance from the virtual camera 2.

The screen 604 is a screen displaying the image that is output from the image switching apparatus 130. That is, the image displayed on the screen 604 is the image that is output by the instructions of a user. The display of the screen 604 is controlled so that the thickness of the contour of the screen is emphasized compared to the other screens 602, 603, and 605. Although not represented in FIG. 6, the screen 604 is colored differently from the other screens. For example, the screen 604 is surrounded by a red thick contour. Because of this, it is made easier for a user to check that the image that is currently output by the image switching apparatus 130 is the image that is displayed on the screen 604.

By using FIG. 6, the output control of the present embodiment is explained, which is performed in the image switching apparatus 130 based on the instructions of the output control unit 108. As described previously, it is assumed that the image whose output is instructed by a user who operates the image switching apparatus 130 is the virtual viewpoint image of the virtual camera 1. Then, it is assumed that the viewpoint of the normal image capturing camera 1 of the normal image capturing camera 1 and the normal image capturing camera 2 is determined to be similar to that of the virtual camera 1. In this case, on the screen 604 of the virtual camera 1 currently being selected, a notification 607 indicating that the normal image capturing camera whose viewpoint is similar exists is displayed on the virtual viewpoint image in an overlapping manner.

In the notification 607 to a user who operates the image switching apparatus 130, information for specifying the similar normal image capturing camera may be included. That is, in the notification 607, information indicating that the viewpoint of the normal image capturing camera 1 is similar to that of the virtual camera 1 may be included.

Further, as the notification method to a user, it may also be possible to give a sound or light notification to a user by using a mechanism that issues sound or light so that the attention of a user is drawn in place of the notification 607 or in addition to the notification 607.

In the present embodiment, the case is explained where a plurality of cameras exists. Because of this, as explained in the first embodiment, it is sufficient for the output control unit 108 to generate the viewpoint comparison table 500 and instruct the image switching apparatus 130 to perform the output control based on the viewpoint comparison table 500.

Alternatively, the number of virtual cameras and the number of normal image capturing cameras may be one, respectively. In that case, on a condition that instructions to turn ON the output control based on the degree of similarity are given at S405 in the flowchart in FIG. 4, the image switching apparatus 130 gives a notification to a user. In a case where instructions to turn OFF the output control based on the degree of similarity are given at S406, the control is performed so that no notification is given to a user.

The display unit that displays the screen 601 may be connected to the image processing apparatus 100. In this case, based on the instructions of the output control unit 108, the CPU 201 of the image processing apparatus 100 performs the display control so that the screen 601 is displayed.

As explained above, according to the present embodiment, the output image switching is performed by the instructions of a user. Because of this, even in a case where the normal image capturing camera whose viewpoint is similar exists, it is made possible for a user to adjust the switching timing, such as that the user does not switch the output on purpose.

Third Embodiment

In the present embodiment, a method is explained in which in a case where a predetermined condition is satisfied, the calculation of the degree of similarity is skipped and the image switching apparatus 130 is instructed to turn OFF the output control based on the degree of similarity. The present embodiment is explained by taking mainly differences from the first embodiment. The portions that are not described explicitly in particular are the same configuration and processing as those of the first embodiment. The difference from the function configuration of the image processing apparatus 100 in the first embodiment is that the processing in the degree of similarity calculation unit 107 is different.

Figure 7:
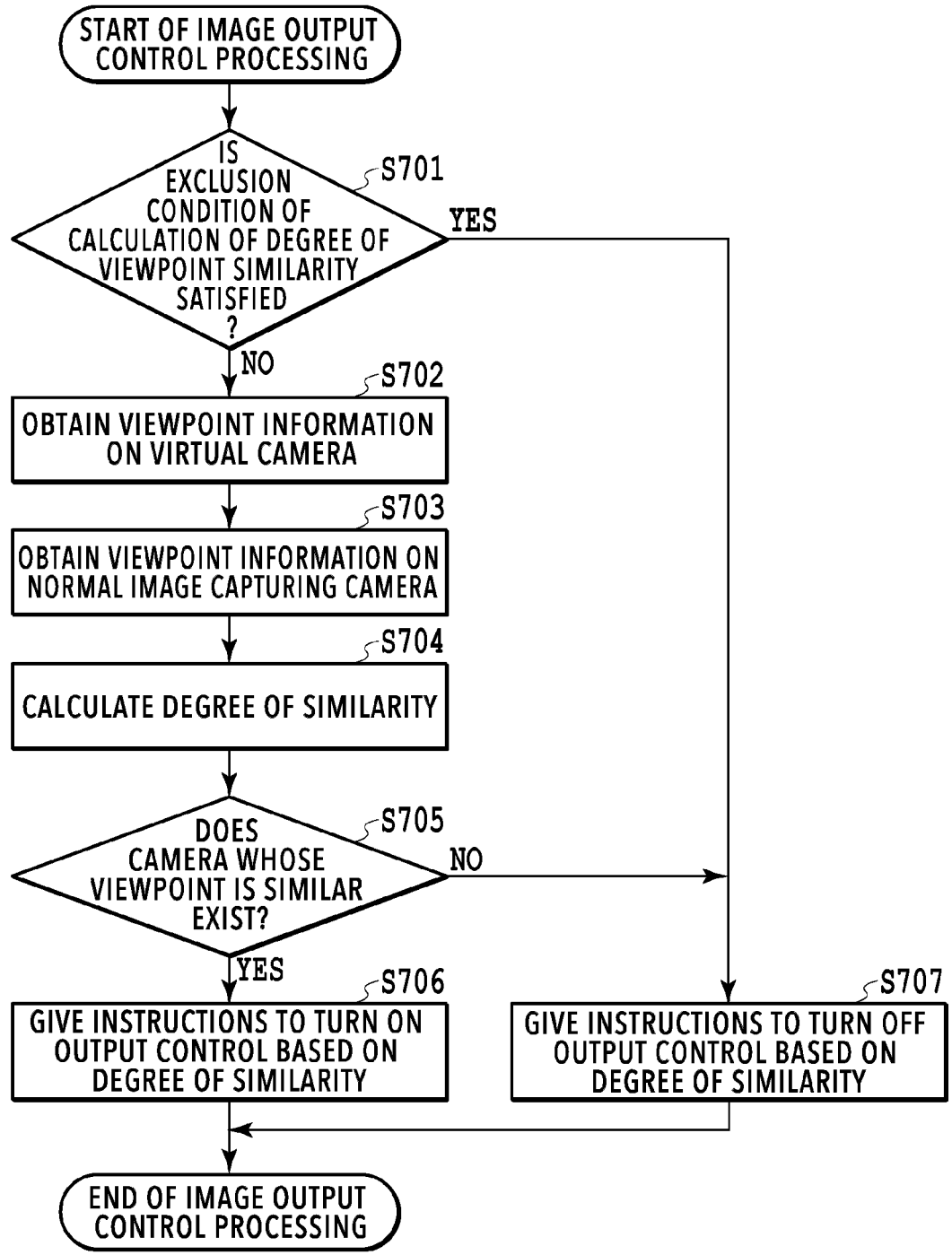
FIG. 7 is a flowchart of image output control processing.

FIG. 7 is a flowchart for explaining image out control processing in the present embodiment. The series of processing shown in the flowchart in FIG. 7 is performed by the CPU 201 of the image processing apparatus 100 loading a program code stored in the ROM 203 onto the RAM 202 and executing the program code. S702 to S707 are the same processing as that at S401 to S406 shown in FIG. 4. In the present embodiment, before S702 to S707 are performed, at S701, the degree of similarity calculation unit 107 determines whether a condition (exclusion condition) not to perform calculation of the degree of viewpoint similarity is satisfied.

A case where the exclusion condition is satisfied is, for example, a case where the relative speed of the object 303 to the virtual camera exceeds a threshold value determined in advance. Alternatively, it may be possible to determine that the exclusion condition is satisfied in a case where the ratio of the area representing the object 303 in the entire virtual viewpoint image is less than a threshold value determined in advance.

Even though the normal image capturing camera 120 or the cameraman 308 is included in the viewing angle of the virtual camera, in a case where the movement of the object 303 is fast, in a case where the ratio at which the object 303 occupies is small, or the like, it is unlikely that a viewer notices a reduction in image quality of the virtual viewpoint image. In the case such as this, the images only need to be switched and displayed in accordance with the instructions of a user, and therefore, it is preferable to turn OFF the output control based on the degree of similarity. Because of this, in the present embodiment, in a case where the exclusion condition is satisfied (YES at S701), the processing advances to S707. The processing at S707 is the same as that at S406. Like the processing in the flowchart in FIG. 4 of the first embodiment, the processing in the flowchart in FIG. 7 is performed repeatedly at predetermined time intervals.

Figure 8:
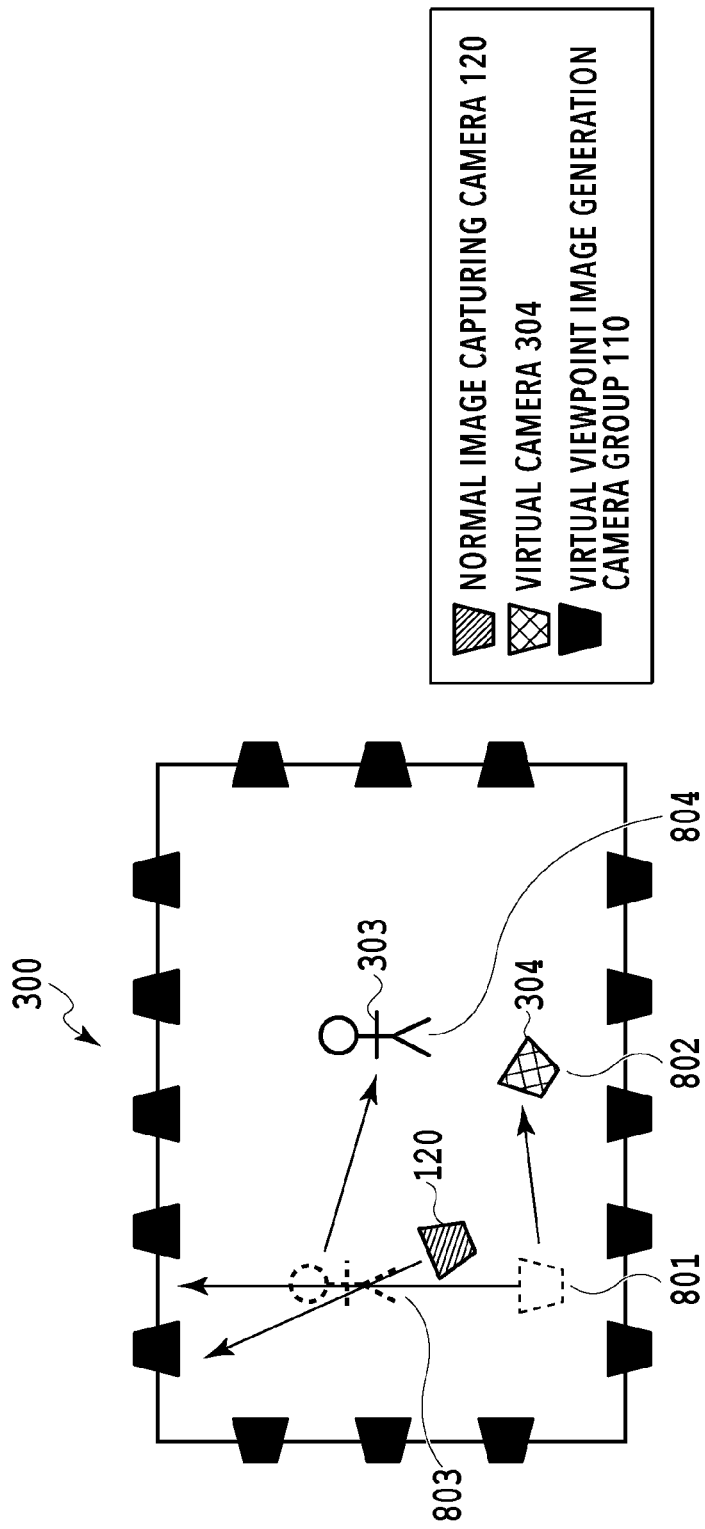
FIG. 8 is a diagram for explaining a relative speed of an object to a virtual camera.

FIG. 8 is a diagram showing the state where the image capturing range 300 of the virtual viewpoint image generation camera group 110 is viewed from a bird's eye. By using FIG. 8, as an example of the processing at S701, an example is explained in which it is determined that the exclusion condition is satisfied in a case where the relative speed of the object to the virtual camera exceeds a threshold value determined in advance.

In FIG. 8, the normal image capturing camera 120 and the virtual camera 304 represent the state of capturing the object 303 at the same time as in FIG. 3. As described previously, S701 to S707 are performed repeatedly at predetermined time intervals. A position 801 is the position of the virtual camera 304 found by the processing at S701 of the previous time and a position 802 shows the position of the virtual camera 304 found by the processing at S701 of this time. As described above, it is indicated that the virtual camera 304 in FIG. 8 is designated so as to capture the object 303 while moving. In FIG. 8, it is indicated that the object 303 exists at a position 803 at the time of the processing at S701 of the previous time and the object 303 is located at a position 804 at the time of the processing at S701 of this time.

In this example, at S701, the degree of similarity calculation unit 107 obtains and stores the position of the virtual camera 304. Because of this, in a case where it is determined that the exclusion condition is not satisfied at S701, in the present embodiment, it is not necessary to determine the position of the virtual camera 304 at S704. Further, at S701, it may also be possible to obtain information not only on the position of the virtual camera but also on the orientation of the virtual camera. In this case, S703 may be skipped.

Then, at S701, the degree of similarity calculation unit 107 calculates the moving speed of the virtual camera 304. The predetermined time intervals at which S701 to S707 in the flowchart in FIG. 7 are performed are set in advance, and therefore, it is possible to calculate the moving speed of the virtual camera 304 by calculating the movement distance of the virtual camera 304 from the change in the position of the virtual camera 304.

Next, at S701, the degree of similarity calculation unit 107 obtains the position of the object 303 and calculates the moving speed of the object 303. As in the case of the virtual camera, by calculating the movement distance from the change the position of the object 303, it is possible to calculate the moving speed.

In the process in which the virtual viewpoint image generation unit 103 generates a three-dimensional model of the object 303 for performing generation processing of a virtual viewpoint image, the position on the world coordinates of the three-dimensional model of the object 303 is found. Because of this, it is possible for the degree of similarity calculation unit 107 to obtain a rough position of the object 303 from the virtual viewpoint image generation unit 103.

In a case where the three-dimensional model of the object 303 is not generated, the object 303 is identified from the images of a plurality of cameras of the virtual viewpoint image generation camera group 110. Then, from the positional relationship of each virtual view-point image generation camera, which is grasped in advance, it is possible to calculate the position of the object 303. The technique to identify the object 303 from the image is not limited. For example, it may be possible to use a technique to separate a moving object from the background, a method of identifying an object by learning the object in advance by machine learning, or the like.

Then, at S701, the degree of similarity calculation unit 107 calculates the relative speed of the object 303 to the virtual camera 304 based on the moving speed of the virtual camera 304 and the moving speed of the object 303. Then, the degree of similarity calculation unit 107 determines whether the relative speed of the object 303 to the virtual camera 304 exceeds a threshold value determined in advance. In a case where the relative speed exceeds a threshold value, it is determined that the exclusion condition is satisfied.

In a case where the relative speed of the object 303 to the virtual camera 304 exceeds a threshold value determined in advance, it is unlikely that a viewer of the image notices a reduction in image quality. Because of this, it is not necessary to perform the output control based on the degree of similarity, which is explained in the first embodiment. Because of this, in a case where it is determined that the exclusion condition is satisfied at S701, the output control unit 108 instructs the image switching apparatus 130 to turn OFF the output control based on the degree of similarity.

In a case where two or more objects (two or more persons) exist, for example, the relative speeds of all the objects are calculated and on a condition that all the relative speeds exceed a threshold value, it is sufficient to determine that the exclusion condition is satisfied at S701. Alternatively, the relative speeds of the objects located within a predetermined range from the position of the virtual camera are calculated and in a case where all the calculated relative speeds exceed a threshold value, it is sufficient to determine that the exclusion condition is satisfied at S701.

Figure 9:
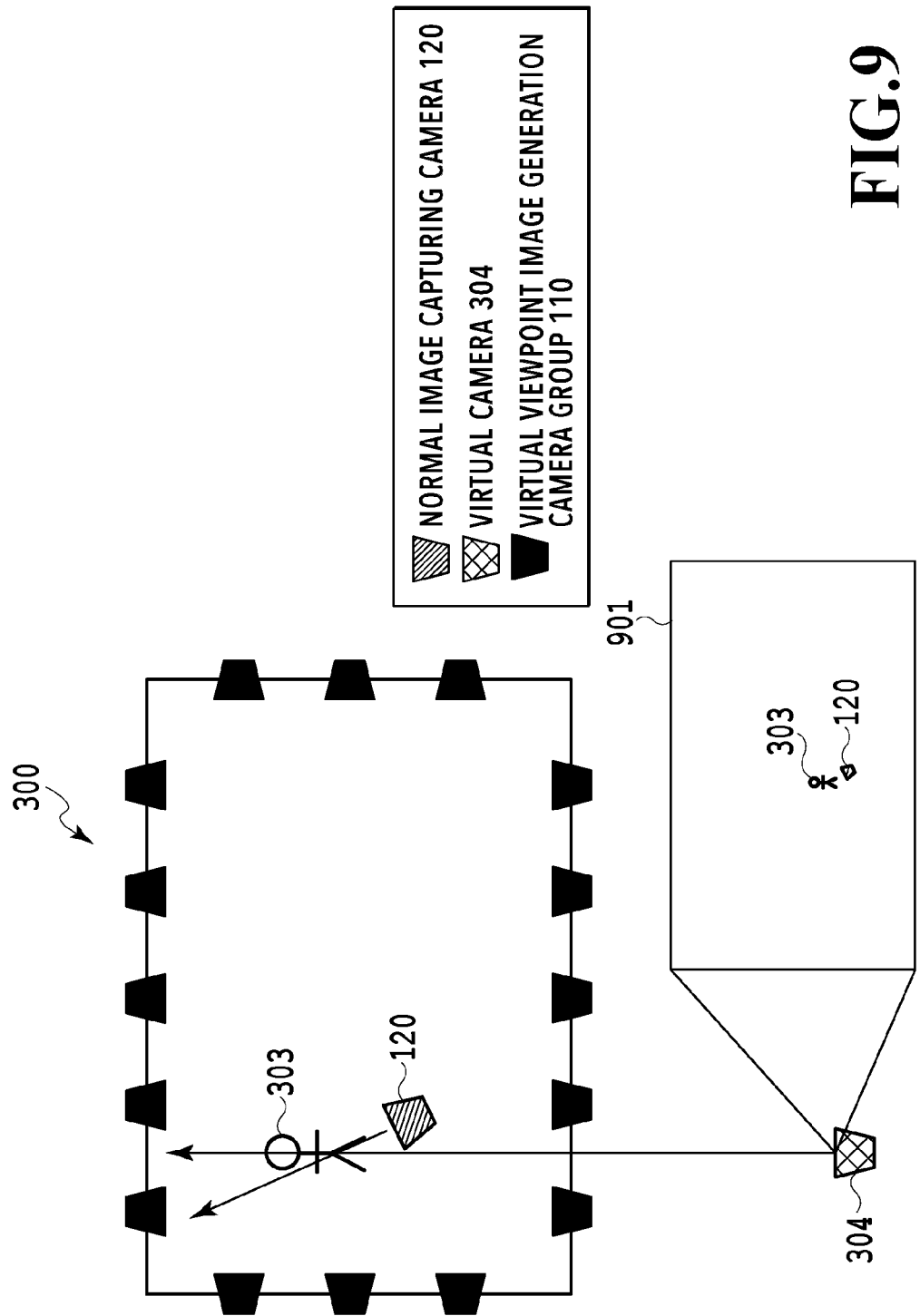
FIG. 9 is a diagram for explaining a ratio at which an object occupies a virtual viewpoint image.

FIG. 9 is a diagram showing the state where the image capturing range 300 of the virtual viewpoint image generation camera group 110 is viewed from a bird's eye and a virtual viewpoint image 901 corresponding to the virtual camera 304. Next, by using FIG. 9, as an example of the processing at S701, an example is explained in which it is determined that the exclusion condition is satisfied in a case where the ratio at which the area representing the object occupies the virtual viewpoint image is smaller than a threshold value.

FIG. 9 shows the state where the normal image capturing camera 120 and the virtual camera 304 captures the object 303 at the same time. The virtual camera 304 in FIG. 9 is designated so as to be located outside the range of the image capturing range 300 of the virtual viewpoint image generation camera group 110. As described above, it is possible for the virtual camera 304 to virtually move to any position within the area in which the world coordinates are defined. Because of this, it is also possible to move the virtual camera 304 to the position at which the virtual camera 304 overlaps the object 303, which is the general state as the position of the virtual camera 304.

In FIG. 9, the virtual camera 304 is in the state of capturing the object 303 and the virtual viewpoint image 901 is an image indicating the viewing angle of the virtual camera 304 in FIG. 9. The virtual camera 304 in FIG. 9 captures the object 303 from a distant position in the zoom-out state, and therefore, the ratio at which the object 303 occupies the entire image on the virtual viewpoint image 901 is small. As in the virtual viewpoint image 901, in a case where the ratio at which the object occupies the entire image is small, a viewer is unlikely to notice a reduction in image quality. Because of this, in a case where it is determined that the ratio at which the area representing the object included in the virtual viewpoint image occupies the entire virtual viewpoint image is smaller than a threshold value, it is determined that the exclusion condition is satisfied and the processing advances to S707.

It is possible to perform the calculation of the ratio at which the area representing the object occupies the entire image of the virtual viewpoint image (viewing angle of the virtual camera), for example, in the process of the generation processing of a virtual viewpoint image. Specifically, in a case where the three-dimensional model of the object is generated, the virtual viewpoint image generation unit 103 performs perspective projection transformation of the vertexes of the circumscribed cuboid of the three-dimensional model onto the side of the virtual camera coordinates of the virtual viewpoint image. In this manner, it is possible to find the ratio at which the area representing the object occupies the virtual viewpoint image. The ratio at which the area representing the object occupies the entire image, which is obtained by this method, is output from the virtual viewpoint image generation unit 103 and the degree of similarity calculation unit 107 may obtain the ratio.

Alternatively, it may also be possible for the degree of similarity calculation unit 107 to determine the ratio at which the area representing the object occupies the entire virtual viewpoint image by obtaining the virtual viewpoint image from the virtual viewpoint image generation unit 103 and performing the processing to identify the object from the virtual viewpoint image. In this case, the method of extracting the object is not limited. For example, as described previously, it may be possible to use a technique to separate a moving object from the background, a method of identifying an object by learning the object in advance by machine learning, or the like.

Alternatively, it may also be possible for the degree of similarity calculation unit 107 to determine that the normal image capturing camera 120 whose virtual viewpoint is similar exists in a case where the normal image capturing camera 120 is included in the viewing angle (field of view) of the virtual camera 304, that is, the normal image capturing camera 120 is included in the virtual viewpoint image 901.

In a case where the determination such as this is performed, it is assumed that the image processing system is provided with a mechanism capable of obtaining the position of the normal image capturing camera 120 and the position can be obtained by the mechanism. As the mechanism of obtaining the position of the camera, there is a method of installing in advance a plurality of reflective markers in the image capturing area and calculating the positional information on the camera itself by capturing the reflective markers. The camera coordinates of the obtained position of the normal image capturing camera 120 are associated with the coordinates on the virtual space by calculating the correspondence relationship from, for example, the relationship between the origin on the virtual space and the coordinates of the camera installed at the origin. Further, by calculating the position on the virtual space of the normal image capturing camera 120 and performing projection transformation of the position onto the virtual viewpoint image 901, it is made possible to determine whether the normal image capturing camera 120 is included in the viewing angle of the virtual viewpoint image 901.

Alternatively, it may also be possible to perform determination by projecting the normal image capturing camera 120, which is the three-dimensional model as one of the objects on the virtual space, onto the viewing angle of the virtual camera 304 and determining whether or not part of the normal image capturing camera 120 is included in the virtual viewpoint image 901. In addition, it may also be possible to determine that the normal image capturing camera 120 is included in the virtual viewpoint image 901 by performing object recognition processing by taking the virtual viewpoint image 901 itself as image data and in a case where the normal image capturing camera 120 is identified. Alternatively, it may also be possible to determine whether the above-described normal image capturing camera 120 is included in a predetermined range determined in advance within the viewing angle in place of the entire viewing angle of the virtual viewpoint image 901.

As described above, in a case where the normal image capturing camera 120 is included in the viewing angle of the virtual camera 304, the output control unit 108 instructs the image switching apparatus 130 to output the image of the normal image capturing camera 120 as the output control based on the degree of similarity. Explanation is given in which it is determined that the degree of similarity is high in a case where the normal image capturing camera 120 is included in the viewing angle of the virtual camera 304, but the explanation is not limited to this. That is, the processing to switch the output image to the captured image of the normal image capturing camera 120 may be performed in a case where the normal image capturing camera 120 is included in the viewing angle of the virtual camera 304, independently of the processing based on the determination of the degree of similarity.

Figure 10:
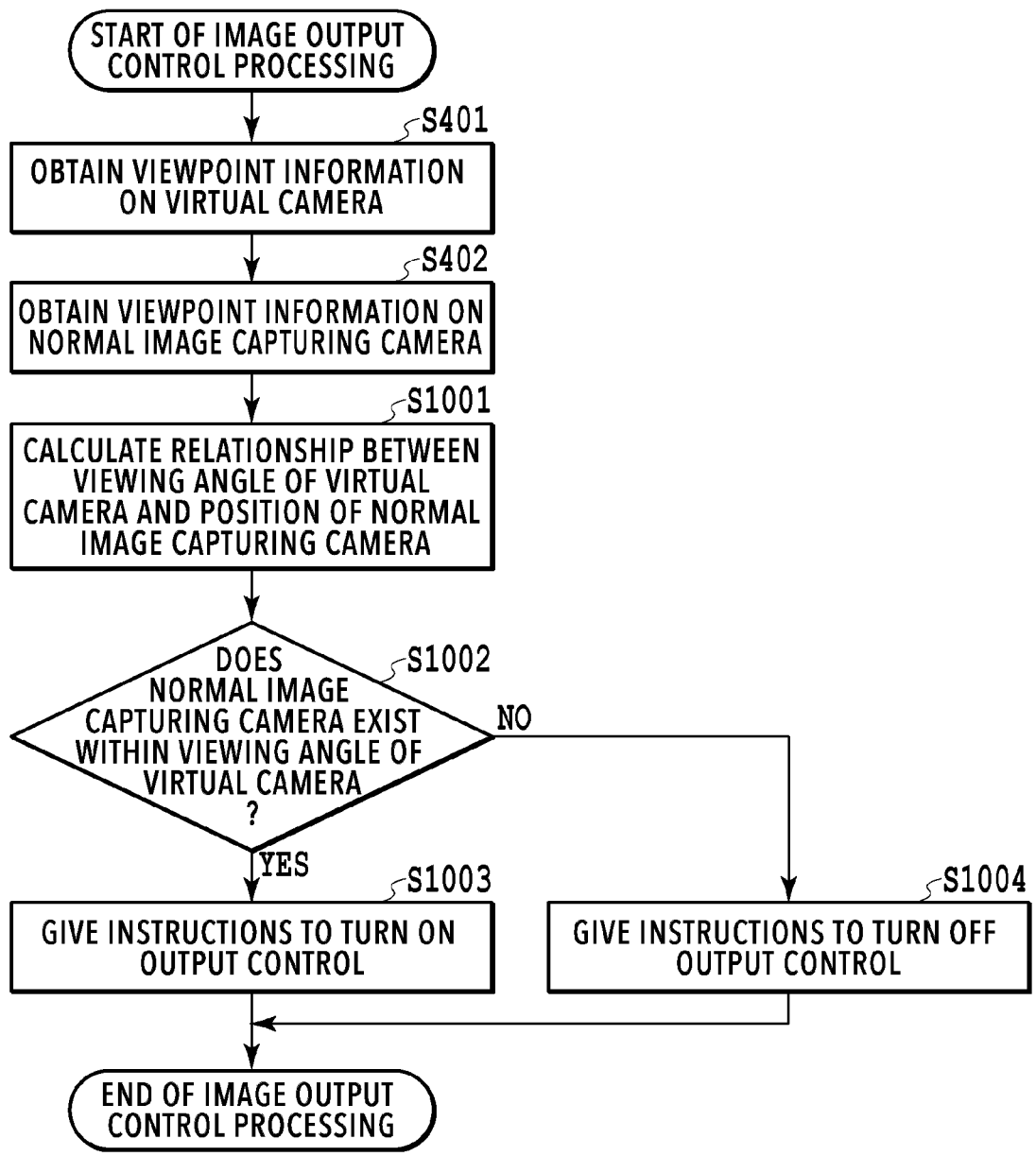
FIG. 10 is a flowchart showing an example of image output control processing.

In the following, by using FIG. 10, processing to switch the output image to the captured image of the normal image capturing camera 120 in a case where the normal image capturing camera 120 is included in the viewing angle of the virtual camera 304 is explained. The same symbol is attached to the same processing step as that in FIG. 4 and explanation is omitted. In the following, it is assumed that the determination of whether the normal image capturing camera 120 is included in the viewing angle of the virtual camera 304 is performed in the degree of similarity calculation unit 107, but the configuration may be one in which a processing unit different from the degree of similarity calculation unit 107 performs the determination.

At S1001, the degree of similarity calculation unit 107 specifies the viewing angle (field of view) of the virtual camera 304 based on the viewpoint information representing the position and orientation of the virtual camera 304. Further, the degree of similarity calculation unit 107 calculates the relation between the position of the normal image capturing camera 120, which is represented by the viewpoint information on the normal image capturing camera 120, and the viewing angle of the virtual camera 304.

At S1002, the degree of similarity calculation unit 107 determines whether the position of the normal image capturing camera 120 is included in the viewing angle of the virtual camera 304 based on the relationship calculated at S1001. As the determination method at this time, for example, a method of specifying whether the position coordinates of the normal image capturing camera 120 are included in the viewing angle of the virtual camera 304, a method of specifying whether the normal image capturing camera 120 is included in the virtual viewpoint image corresponding to the virtual camera 304, or the like is used.

In a case where the position of the normal image capturing camera 120 is included in the viewing angle of the virtual camera 304, at S1003, the output control unit 108 instructs the image switching apparatus 130 to turn ON the output control. In a case where the position of the normal image capturing camera 120 is not included in the viewing angle of the virtual camera 304, at S1004, the output control unit 108 instructs the image switching apparatus 130 to turn OFF the output control. It is assumed that the processing at S1003 and S1004 is the same as the processing at S405 and S406, respectively.

By the processing explained above, in a case where the normal image capturing camera 120 is included in the viewing angle of the virtual camera 304, the output image is switched to the captured image of the normal image capturing camera 120, and therefore, it is possible to suppress the normal image capturing camera 120 from entering the virtual viewpoint image. It may also be possible to further combine the determination by the degree of similarity with the processing explained in FIG. 10.

Further, it may also be possible for the output control unit 108 to give instructions to the virtual viewpoint image generation unit 103 so that the virtual camera 304 moves to the position of the normal image capturing camera 120 at the time of performing switching so that the image of the normal image capturing camera 120 is output. At this time, at the point in time at which the virtual camera 304 reaches the position of the normal image capturing camera 120, the output is switched to the image of the normal image capturing camera 120.

As explained above, according to the present embodiment, it is possible to perform control to output the image designated by a user while suppressing a reduction in image quality of the virtual viewpoint image that is output. According to the technique of the present disclosure, it is possible to suppress the influence of the existence of the normal image capturing camera in the image capturing range of the virtual viewpoint image generation camera.

OTHER EMBODIMENTS

In the above-described embodiments, explanation is given on the assumption that the image processing apparatus 100 and the image switching apparatus 130 are different apparatuses, but the function of the image switching apparatus 130 may be included in the image processing apparatus 100.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-102465 filed Jun. 21, 2021, and No. 2022-009393 filed Jan. 25, 2022, which are hereby incorporated by reference wherein in their entirety.

What is claimed is:

1. An information processing apparatus comprising:
one or more memories storing instructions; and
one or more processors executing the instructions to:
obtain first viewpoint information for specifying a virtual viewpoint corresponding to a virtual viewpoint image and second viewpoint information representing a viewpoint of a first image capturing apparatus existing in an image capturing range of a second image capturing apparatus that is used for generating the virtual viewpoint image;
output the virtual viewpoint image or an image captured by the first image capturing apparatus; and
perform control so that the image captured by the first image capturing apparatus is output in a case where a position of the first image capturing apparatus specified by the second viewpoint information is included in a field of view of the virtual viewpoint specified by the first viewpoint information.

2. The information processing apparatus according to claim 1, wherein
the one or more processors further execute the instructions to:
calculate a value to determine similarity of a viewpoint based on the first viewpoint information and the second viewpoint information and
in a case where the virtual viewpoint and the viewpoint of the first image capturing apparatus are determined to be similar based on the value, control is performed so that the image captured by the first image capturing apparatus is output.

3. The information processing apparatus according to claim 1, wherein
the one or more processors further execute the instructions to:
obtain the virtual viewpoint image corresponding to the virtual viewpoint and the image captured by the first image capturing apparatus; and
calculate a degree of image similarity between the virtual viewpoint image and the image captured by the first image capturing apparatus and
in a case where the degree of image similarity is higher than a threshold value, the control is performed so that the image captured by the first image capturing apparatus is output.

4. The information processing apparatus according to claim 2, wherein
a first position and a first direction are obtained as the first viewpoint information and a second position and a second direction are obtained as the second viewpoint information, the first position being a position of the virtual viewpoint, the first direction being a view direction from the virtual viewpoint, the second position being a position of the first image capturing apparatus, the second direction being a direction of an orientation of the first image capturing apparatus and
in the calculating, a distance from the first position to the second position and an angle representing a difference between the first direction and the second direction are calculated.

5. The information processing apparatus according to claim 2, wherein
the information processing apparatus is configured so as to capable of switching the image that is output to one of the image captured by the first image capturing apparatus and the virtual viewpoint image by instructions of a user and
control is performed so that the output in accordance with the value to determine similarity is performed.

6. The information processing apparatus according to claim 2, wherein
in a case where a plurality of the first image capturing apparatuses exists, it is determined whether each viewpoint of the plurality of the first image capturing apparatuses and the virtual viewpoint are similar.

7. The information processing apparatus according to claim 6, wherein
in a case where the viewpoint of the plurality of the first image capturing apparatuses similar to the virtual viewpoint exists, control is performed so that an image captured by one of the plurality of the first image capturing apparatuses is output.

8. The information processing apparatus according to claim 2, wherein the information processing apparatus is configured so as to be capable of receiving instructions from a user to select one of the image captured by the first image capturing apparatus and the virtual viewpoint image as the image that is output and in a case where it is determined that the virtual viewpoint and the viewpoint of the first image capturing apparatus are similar and the virtual viewpoint image is being output, the output image is switched to the image captured by the first image capturing apparatus; and in a case where it is determined that the virtual viewpoint and the viewpoint of the first image capturing apparatus are similar, on a condition that the user gives instructions to switch the output image from the image captured by the first image capturing apparatus to the virtual viewpoint image, control is performed so that the image captured by the first image capturing apparatus is output irrespective of the instructions.

9. The information processing apparatus according to claim 2, wherein
in a case where a predetermined condition is satisfied, control not based on the value to determine similarity is performed.

10. The information processing apparatus according to claim 9, wherein
in the image capturing range, an object is included and
a case where the predetermined condition is satisfied is a case where a relative speed of the object to the virtual viewpoint is higher than a predetermined value.

11. The information processing apparatus according to claim 9, wherein
in the image capturing range, an object is included and
a case where the predetermined condition is satisfied is a case where a ratio at which the object occupies the virtual viewpoint image is smaller than a predetermined value.

12. The information processing apparatus according to claim 1, wherein
based on instructions of a user, the virtual viewpoint image or the image captured by the first image capturing apparatus is output and
in a case where the position of the first image capturing apparatus which is specified by the second viewpoint information is included in a field of view of the virtual viewpoint specified by the first viewpoint information, control is performed so that a predetermined notification is given to the user.

13. The information processing apparatus according to claim 12, wherein
the predetermined notification is a notification including information representing that the position of the first image capturing apparatus which is specified by the second viewpoint information is included in a field of view of the virtual viewpoint specified by the first viewpoint information.

14. The information processing apparatus according to claim 1, wherein
in a case where an image representing the first image capturing apparatus is included in the virtual viewpoint image, control is performed so that the image captured by the first image capturing apparatus is output.

15. An information processing method comprising:
obtaining first viewpoint information for specifying a virtual viewpoint corresponding to a virtual viewpoint image and second viewpoint information representing a viewpoint of a first image capturing apparatus existing in an image capturing range of a second image capturing apparatus that is used for generating the virtual viewpoint image;
outputting the virtual viewpoint image or an image captured by the first image capturing apparatus; and
performing control so that the image captured by the first image capturing apparatus is output in a case where a position of the first image capturing apparatus specified by the second viewpoint information is included in a field of view of the virtual viewpoint specified by the first viewpoint information.

16. A non-transitory computer readable storage medium storing a program which causes a computer to perform an information processing method comprising:
obtaining first viewpoint information for specifying a virtual viewpoint corresponding to a virtual viewpoint image and second viewpoint information representing a viewpoint of a first image capturing apparatus existing in an image capturing range of a second image capturing apparatus that is used for generating the virtual viewpoint image;
outputting the virtual viewpoint image or an image captured by the first image capturing apparatus; and
performing control so that the image captured by the first image capturing apparatus is output in a case where a position of the first image capturing apparatus specified by the second viewpoint information is included in a field of view of the virtual viewpoint specified by the first viewpoint information.

* * * * *